United States Patent
Kruglick

(10) Patent No.: US 9,195,490 B2
(45) Date of Patent: Nov. 24, 2015

(54) DIFFERENTIAL VOLTAGE AND FREQUENCY SCALING (DVFS) SWITCH REDUCTION

(71) Applicant: EMPIRE TECHNOLOGY DEVELOPMENT LLC, Wilmington, DE (US)

(72) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 47 days.

(21) Appl. No.: 14/347,894

(22) PCT Filed: Jul. 9, 2013

(86) PCT No.: PCT/US2013/049738
§ 371 (c)(1),
(2) Date: Mar. 27, 2014

(87) PCT Pub. No.: WO2015/005909
PCT Pub. Date: Jan. 15, 2015

(65) Prior Publication Data
US 2015/0046923 A1     Feb. 12, 2015

(51) Int. Cl.
*G06F 9/455* (2006.01)
*G06F 1/00* (2006.01)
*G06F 11/30* (2006.01)

(52) U.S. Cl.
CPC ............ *G06F 9/45533* (2013.01); *G06F 9/455* (2013.01); *G06F 11/30* (2013.01)

(58) Field of Classification Search
CPC ....... G06F 1/30; G06F 9/455; G06F 9/45533; G06F 11/30

USPC ....................... 718/1; 713/300–340
See application file for complete search history.

(56) References Cited

U.S. PATENT DOCUMENTS

| | | | | |
|---|---|---|---|---|
| 7,730,340 | B2* | 6/2010 | Hu et al. | 713/323 |
| 7,739,532 | B2* | 6/2010 | Grobman | 713/322 |
| 7,840,825 | B2* | 11/2010 | Altevogt et al. | 713/320 |
| 8,261,112 | B2* | 9/2012 | Carter et al. | 713/320 |
| 8,364,997 | B2* | 1/2013 | Tian et al. | 713/322 |

(Continued)

OTHER PUBLICATIONS

"AMD64 Architecture Programmer's Manual," System Programming, 2012, pp. 624, vol. 2, Advanced Micro Devices.

(Continued)

*Primary Examiner* — Qing Chen
(74) *Attorney, Agent, or Firm* — Moritt Hock & Hamroff LLP; Steven S. Rubin, Esq.

(57) ABSTRACT

Technologies are generally described for systems, devices and methods effective to schedule access to a core. In some examples, a first differential voltage frequency scaling (DVFS) value of a first virtual machine may be received by a virtual machine manager. A second DVFS value of a second virtual machine may be received by the virtual machine manager. A third DVFS value of a third virtual machine may be received by the virtual machine manager. The third DVFS value may be substantially the same as the first DVFS value and different from the second DVFS value. A dispatch cycle may be generated to execute the first, second and third virtual machines on the core. After execution of the first virtual machine, the dispatch cycle may require execution of the third virtual machine before execution of the second virtual machine.

18 Claims, 5 Drawing Sheets

(56) References Cited

U.S. PATENT DOCUMENTS

| | | | |
|---|---|---|---|
| 8,402,140 B2* | 3/2013 | Zhang et al. | 709/226 |
| 8,493,856 B2* | 7/2013 | Francini et al. | 370/231 |
| 8,645,733 B2* | 2/2014 | Kansal et al. | 713/320 |
| 8,892,916 B2* | 11/2014 | Bieswanger et al. | 713/320 |
| 2007/0150893 A1* | 6/2007 | Grobman | 718/1 |
| 2008/0098254 A1* | 4/2008 | Altevogt et al. | 713/600 |
| 2008/0201591 A1* | 8/2008 | Hu et al. | 713/323 |
| 2009/0132840 A1 | 5/2009 | Talwar et al. | |
| 2010/0037038 A1* | 2/2010 | Bieswanger et al. | 712/220 |
| 2011/0149990 A1 | 6/2011 | Francini et al. | |
| 2011/0154321 A1 | 6/2011 | Tian et al. | |
| 2011/0173329 A1 | 7/2011 | Zhang et al. | |
| 2012/0290865 A1 | 11/2012 | Kansal et al. | |
| 2013/0205126 A1* | 8/2013 | Kruglick | 713/1 |

OTHER PUBLICATIONS

"vSphere Resource Management Guide," VMware Inc, 2006-2011, pp. 1-120.

Bertran, R., et al., "Counter-Based Power Modeling Methods: Top-Down Vs. Bottom-Up," The Computer Journal, 2012, pp. 198-213, vol. 56, No. 2.

Binet, G. "Forcing the CPU affinity can make a monothreaded process run 2-3x faster," accessed at http://klaig.blogspot.com/2012/12/forcing-cpu-affinity-can-make.html, Dec. 8, 2012, pp. 1-3.

Flautner, K., and Mudge, T., "Vertigo: Automatic Performance-Setting for Linux," Proc. 5th Symp. Operating Systems Design and Implementation, 2002, pp. 105-116, The Usenix Association.

Howard, J., et al., "A 48-Core IA-32 Processor in 45 Nm CMOS Using On-Die Message-Passing and DVFS for Performance and Power Scaling," IEEE Journal of Solid-State Circuits, 2011, pp. 173-183, vol. 46, No. 1.

Kong, J., et al., "Low-Cost Application-Aware DVFS for Multi-core Architecture," IEEE Third International Conference on Convergence and Hybrid Information Technology, 2008, pp. 106-111.

Myers, M., and Youndt., S., "An Introduction to Hardware-Assisted Virtual Machine (HVM) Rootkits," White Paper of Crucial Security, 2007-2009, pp. 1-15, Harris Corporation.

Nathuji, R., and Schwan, K., "VirtualPower: Coordinated Power Management in Virtualized Enterprise Systems," ACM SIGOPS Operating Systems Review, 2007, pp. 265-278, vol. 41, No. 6.

Nathuji, R., et al., "Feedback Driven QoS-Aware Power Budgeting for Virtualized Servers," In Fourth International Workshop on Feedback Control Implementation and Design in Computing Systems and Networks (FeBID), 2009, 6 pages.

Seagrave, S., "Saving Power with VMware vSphere ESX—Dynamic Voltage and Frequency Scaling (DVFS)," accessed at http://web.archive.org/web/20130520161721/http://techhead.co/saving-power-with-vmware-vsphere-esx-dynamic-voltage-and-frequency-scaling-dvfs/, Oct. 27, 2009, pp. 1-6.

Zabaljáuregui, M., "Hardware Assisted Virtualization Intel Virtualization Technology", 2008, pp. 1-53.

International Search Report and Written Opinion for International Application No. PCT/US2013/049738, mailed on Jan. 29, 2014, 6 pages.

* cited by examiner

400 A computer program product.
402 A signal bearing medium.

404

At least one of
- One or more instructions for a method for scheduling access to a core; or
- One or more instructions for receiving, by a virtual machine manager, a first differential voltage frequency scaling (DVFS) value of a first virtual machine; or
- One or more instructions for receiving, by the virtual machine manager, a second DVFS value of a second virtual machine; or
- One or more instructions for receiving, by the virtual machine manager, a third DVFS value of a third virtual machine, wherein the third DVFS value is substantially the same as the first DVFS value and different from the second DVFS value; or
- One or more instructions for generating a dispatch cycle to execute the first, second and third virtual machines on the core, wherein after execution of the first virtual machine, the dispatch cycle requires execution of the third virtual machine before execution of the second virtual machine.

| 406 A computer readable medium | 408 A recordable medium | 410 A communications medium |

Fig. 4

DIFFERENTIAL VOLTAGE AND FREQUENCY SCALING (DVFS) SWITCH REDUCTION

CROSS REFERENCE TO RELATED APPLICATIONS

This application is the National Stage filing under 35 U.S.C. §371 of PCT Application Ser. No. PCT/US13/49738 filed on Jul. 9, 2013. The disclosure of the PCT Application is hereby incorporated herein by reference in its entirety.

BACKGROUND

Unless otherwise indicated herein, the materials described in this section are not prior art to the claims in this application and are not admitted to be prior art by inclusion in this section.

In computing systems, matching computational resources to tasks that may be currently under execution by a processing unit may improve power management. Differential voltage and frequency scaling ("DVFS") may be used at the operating system or application level to alter the voltage and/or frequency supplied to processing units according to varying process demands. Computing systems may incorporate virtualization where a core may execute two or more virtual machines.

SUMMARY

In one example, methods for scheduling access to a core are generally described. The methods may include receiving a first differential voltage frequency scaling (DVFS) value of a first virtual machine. The methods may further include receiving a second DVFS value of a second virtual machine. The methods may include receiving a third DVFS value of a third virtual machine. The third DVFS value may be substantially the same as the first DVFS value and different from the second DVFS value. The methods may further include generating a dispatch cycle to execute the first, second and third virtual machines on the core. After execution of the first virtual machine, the dispatch cycle may require execution of the third virtual machine before execution of the second virtual machine.

In one example, methods for scheduling access to a core are generally described. The methods may include receiving a first differential voltage frequency scaling (DVFS) value of a first virtual machine. The methods may further include receiving a second DVFS value of a second virtual machine. The methods may include generating a first dispatch cycle to execute the first and second and virtual machines on the core. The methods may further include modifying the dispatch cycle to produce a second dispatch cycle. The second dispatch cycle may cause the core to execute the virtual machine manager at the first DVFS value. The second dispatch cycle may cause the core to execute the first virtual machine. The second dispatch cycle may cause the core to execute the virtual machine manager at the first DVFS value. The second dispatch cycle may cause the core to execute the virtual machine manager at the second DVFS value. The second dispatch cycle may further cause the core to execute the second virtual machine.

In one example, systems effective to schedule access to a core are generally described. The systems may include a memory that includes instructions. The systems may further include a processor configured to be in communication with the memory. The processor may be effective to, in accordance with the instructions, receive a first differential voltage frequency scaling (DVFS) value of a first virtual machine. The processor may be further effective to, in accordance with the instructions, receive a second DVFS value of a second virtual machine. The processor may be effective to, in accordance with the instructions, receive a third DVFS value of a third virtual machine. The third DVFS value may be substantially the same as the first DVFS value and different from the second DVFS value. The processor may be further effective to, in accordance with the instructions, generate a dispatch cycle to execute the first, second and third virtual machines on the core. After execution of the first virtual machine, the dispatch cycle may require execution of the third virtual machine before execution of the second virtual machine. The dispatch cycle may cause the core to execute a virtual machine manager at the first DVFS value. The dispatch cycle may further cause the core to execute the third virtual machine. The dispatch cycle may further cause the core to execute the virtual machine manager at the third DVFS value. The dispatch cycle may further cause the core to execute the virtual machine manager at the second DVFS value. The dispatch cycle may further cause the core to execute the second virtual machine.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 illustrates an example computer program product that can be utilized to implement DVFS switch reduction.

DETAILED DESCRIPTION

Figure 1:
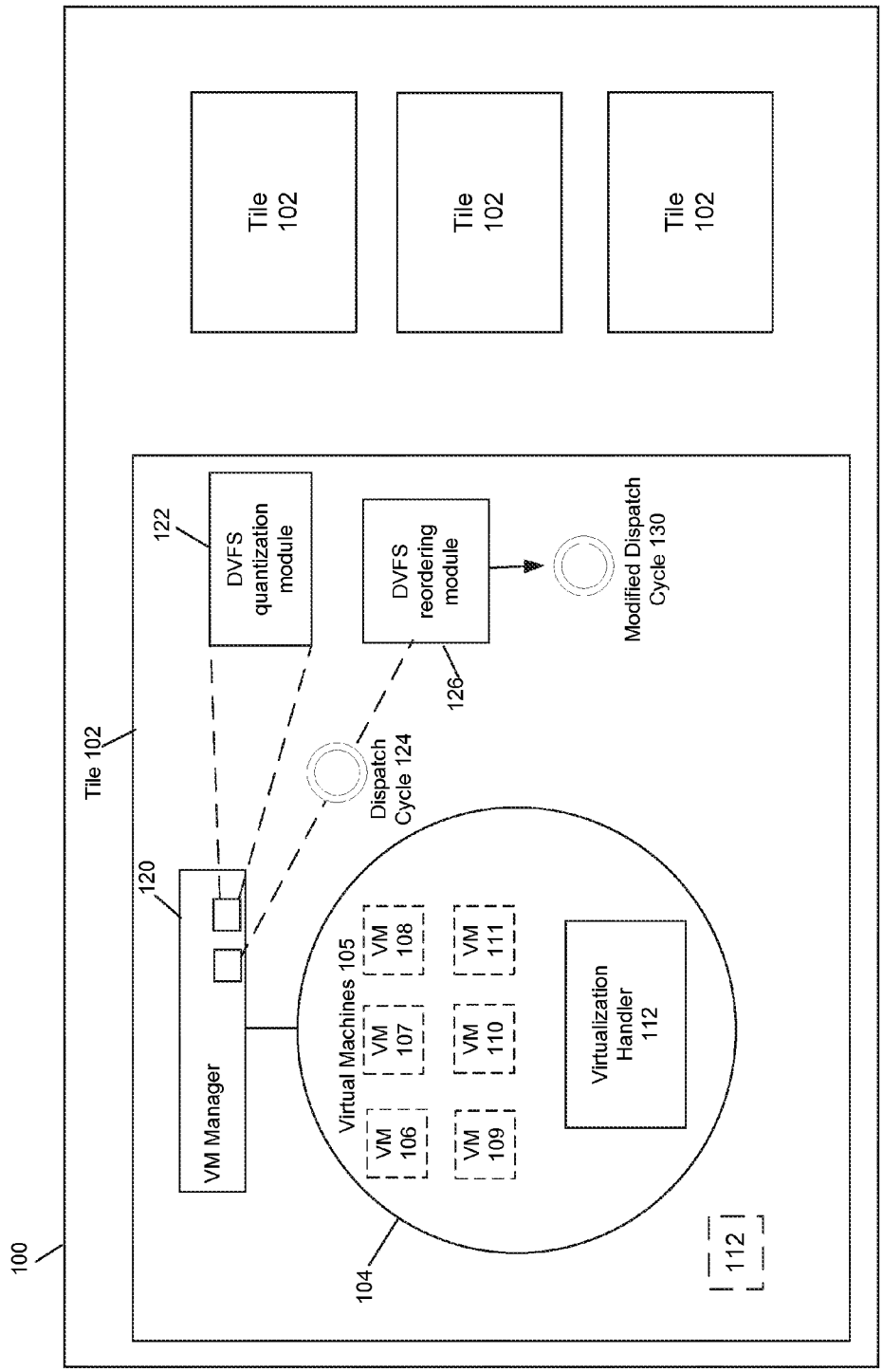
FIG. 1 illustrates an example system that can be utilized to implement differential voltage and frequency scaling (DVFS) switch reduction.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the drawings, can be arranged, substituted, combined, separated, and designed in a wide variety of different configurations, all of which are explicitly contemplated herein.

This disclosure is generally drawn to, inter alia, to technologies including methods, apparatus, systems, devices, and computer program products related to differential voltage and frequency scaling (DVFS) switch reduction.

Briefly stated, technologies are generally described for systems, devices and methods effective to schedule access to a core. A first differential voltage frequency scaling (DVFS) value of a first virtual machine may be received by a virtual machine manager. A second DVFS value of a second virtual machine may be received by the virtual machine manager. A third DVFS value of a third virtual machine may be received by the virtual machine manager. The third DVFS value may be substantially the same as the first DVFS value and different from the second DVFS value. A dispatch cycle may be generated to execute the first, second and third virtual machines on the core. After execution of the first virtual machine, the dispatch cycle may require execution of the third virtual machine before execution of the second virtual machine.

FIG. 1 illustrates an example system that can be utilized to implement differential voltage and frequency scaling (DVFS) switch reduction, arranged according to at least some embodiments described herein. As depicted, an example processor 100 may include one or more tiles 102. Tiles 102 may include one or more cores 104. Each core 104 may be an independent central processing unit that may read and execute program instructions. Core 104 may include one or more instantiations of virtual machines ("VMs") 105 (including VM 106, VM 107, VM 108, VM 109, VM 110, and VM 111) and/or an instantiation of a virtual machine manager 120. Virtual machines 105 may be software instantiations of a computing environment or operating system. Virtual machines 105 may emulate the architecture and/or the functions of a physical machine. Tile 102 may include a virtualization handler 112. Virtualization handler 112 may be hardware located inside or outside of core 104 and may monitor instructions requested to be executed by one or more virtual machines 105. Virtualization handler 112 may be configured to store control data related to instructions executed by one or more virtual machines 105. Virtual machine manager 120 may be used to instantiate and/or control virtual machines 105. Virtual machine manager 120 may selectively allow virtual machines 105, and virtual machine manager 120 itself, to access core 104 based on a dispatch cycle 124. Dispatch cycle 124 may be, for example, a scheduling tool configured to allow access to core 104. Additionally, virtual machine manager 120 may instantiate and/or control execution of virtual machines 105 across one or more cores 104.

Different voltage and frequency scaling ("DVFS") values may be implemented at one or more tiles 102. In examples where a tile has more than one core, the DVFS value may apply for each core in the tile. DVFS scaling may result in a DVFS value assigned by an operating system to each virtual machine 105. A DVFS value may be a voltage and/or a frequency at which core 104 may operate and may be adjusted or scaled depending upon circumstances. Virtual machine manager 120 may receive information relating to DVFS values of each virtual machine 105. In an example where a tile provides DVFS information for two or more virtual machines executed on two or more cores, virtual machine manager 120 may optimize the DVFS information by using the highest received DVFS value for the tile. Virtual machine manager 120 may include a DVFS quantization module 122. DVFS quantization module 122 may be configured to quantize DVFS values of virtual machines 105 into a finite set of discrete states. DVFS values may be stored, for example, in one or more floating point registers. In an example, DVFS quantization module 122 may quantize DVFS values of virtual machines 105 by controlling values stored in the one or more floating point registers. For example, prior to quantization, DVFS values may take a nearly infinite number of values. After quantization, DVFS quantization module 122 may limit available DVFS values to a limited number of different values. The limited number of different values may be the finite set of discrete DVFS states. DVFS quantization module 122 may also be located in virtualization handler 112 or elsewhere within processor 100. Tile 102 may include a DVFS reordering module 126. DVFS reordering module 126 may be included in virtual machine manager 120, virtualization handler 112 or elsewhere within processor 100. DVFS reordering module 126 may receive a dispatch cycle 124 of virtual machines 105 and virtual machine manager 120. DVFS reordering module 126 may re-order dispatch cycle 124 to produce modified dispatch cycle 130 as is discussed below.

During operation, one of the virtual machines 105 may be executed by core 104. To execute a switch from core 104 executing a first virtual machine to a second virtual machine, core 104 may exit the first virtual machine. During an exit, access to core 104 may be passed from the first, exiting virtual machine 105, to virtual machine manager 120. Core 104 may execute virtual machine manager 120. Thereafter, virtual machine manager 120 may pass access to core 104 to the next consecutive virtual machine 105 in dispatch cycle 124. In some examples, the first virtual machine, the virtual machine manager and the second virtual machine may all have different DVFS values. When core 104 switches execution from a virtual machine to another virtual machine, including switching to the virtual machine manager, a DVFS switch may also occur. As described in more detail below, virtual machine manager 120 may modify dispatch cycle 124, with use of DVFS reordering module 126, to produce modified dispatch cycle 130. Modified dispatch cycle 130 may reduce a number of DVFS switches when virtual machines exit a core. As discussed herein, virtual machine manager 120 may: 1) quantize DVFS values 2) adjust sizes of blocks of core time and/or 3) re-order blocks in the dispatch cycle.

Figure 2:
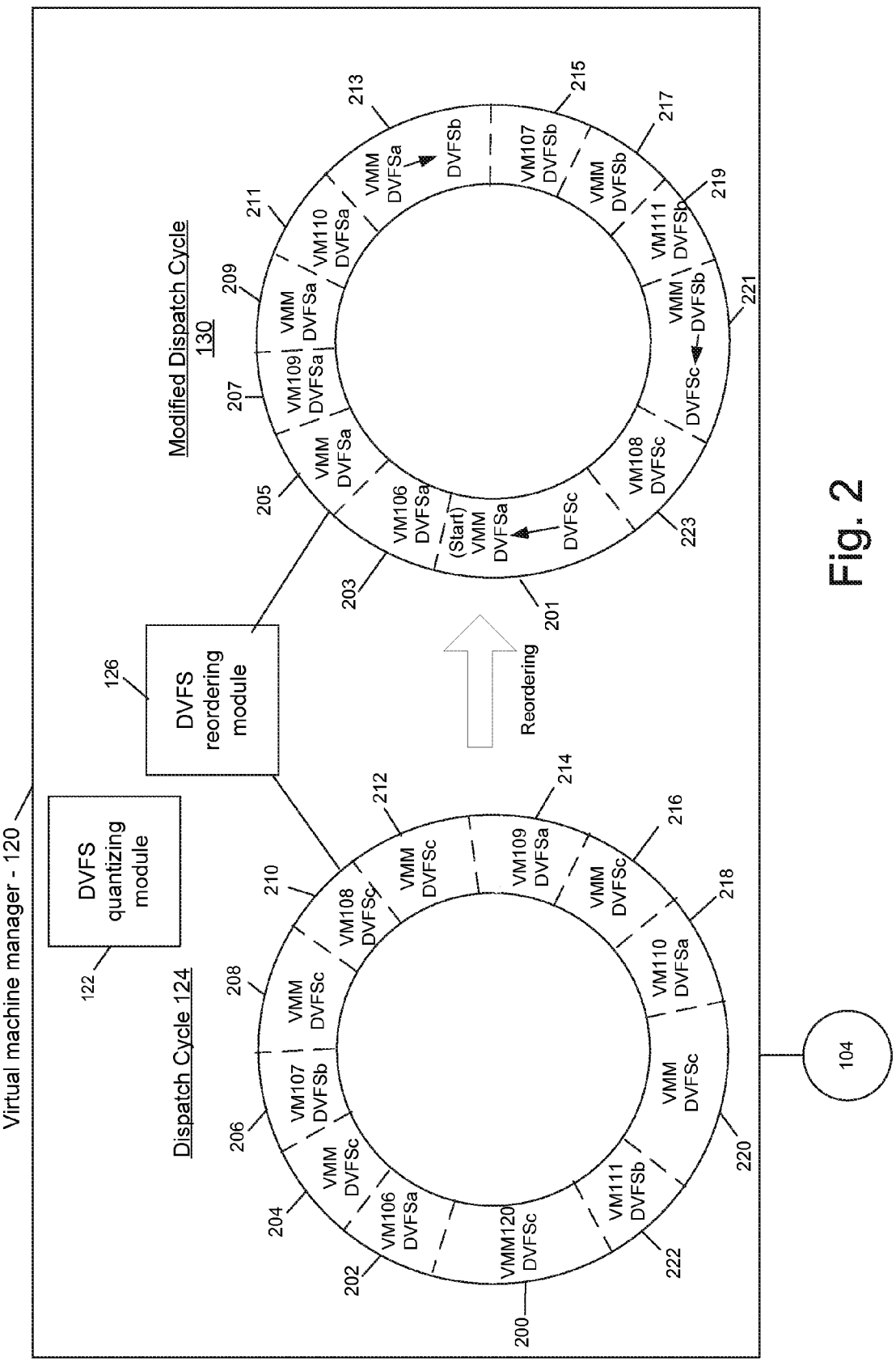
FIG. 2 depicts the example system of FIG. 1 illustrating additional details relating to a dispatch cycle.

FIG. 2 illustrates the example system of FIG. 1 with additional details relating to a dispatch cycle, arranged in accordance with at least some embodiments described herein. Those components in FIG. 2 that are labeled identically to components of FIG. 1 will not be described again for the purposes of clarity and brevity.

As depicted, example dispatch cycle 124 may include blocks 200, 202, 204, 206, 208, 210, 212, 214, 216, 218, 220 and 222. Modified dispatch cycle 130 may include blocks 201, 203, 205, 207, 209, 211, 213, 215, 217, 219, 221 and 223. The illustrated blocks may represent a percentage of core time allotted for a virtual machine, and for virtual machine manager, to access core 104. Blocks of a particular dispatch cycle 124 may total to substantially 100% of total core time for the particular dispatch cycle. In order to ensure that virtual machine manager 120 may perform necessary operations during dispatch cycle 124, virtual machine manager 120 may adjust sizes of blocks of other virtual machines. For example, if the number of virtual machines to be executed during a particular dispatch cycle has increased relative to a previous dispatch cycle, virtual machine manager 120 may reduce the size of blocks corresponding to one or more of the virtual machines.

In another example, virtual machines 105 may be scheduled to be sequentially executed by core 104 based on dispatch cycle 124. Access to core 104 may be passed to virtual machine manager 120 between executions of each consecutive virtual machine 105. In another example, execution of privileged instructions by a virtual machine 105 may trigger the passing of core access to virtual machine manager 120. Following the triggering event, access to core 104 may be returned to the previously executed virtual machine 105. Core 104 may operate at a different voltage and/or frequency based on a requested DVFS value of a virtual machine 105 or a DVFS value of virtual machine manager 120. DVFS quantization module 122 may quantize received DVFS values into a finite set of discrete DVFS states. Any number of discrete DVFS states may be used for the system described herein.

In an example, in block 202 of dispatch cycle 124, virtual machine ("VM") 106 may operate at a first quantized voltage and a first quantized frequency denoted by "DVFSa." Similarly, in block 206 of dispatch cycle 124, virtual machine 107 may operate at a second quantized voltage and a second quantized frequency denoted by "DVFSb." Virtual machine manager ("VMM") 120 may also operate at a quantized voltage and frequency denoted by "DVFSc."

As discussed previously, virtual machine manager 120 may adjust a size of blocks of core time assigned to respective virtual machines 105 and assigned to virtual machine manager 120 in dispatch cycle 124. Adjusting the size of the blocks may help ensure that processing needs of each virtual machine 105 are satisfied and that service level guarantees are met. Virtual machine manager 120 may be configured to adjust the size of the blocks based on a determination of processing needs and/or service level guarantees of virtual machines 105. For example, virtual machine manager 120 may increase the size of a block corresponding to a particular virtual machine, where the virtual machine may require increased access to core 104 to perform a scheduled task. Virtual machine manager 120 may modify its own DVFS value so that the DVFS state of virtual machine manager 120 matches the DVFS state of a next consecutive virtual machine in a dispatch cycle. Virtual machine manager 120 may further adjust sizes of blocks assigned to virtual machines knowing that the DVFS state of virtual machine manager 120 will change during the dispatch cycle. For example, virtual machine manager 120 may determine that during the next dispatch cycle, virtual machine manager 120 will need to reduce its DVFS state to match the DVFS state of one or more incoming virtual machines. While operating at the reduced DVFS state, virtual machine manager 120 may require a longer amount of time, relative to higher DVFS states, to perform virtual machine manager operations. Accordingly, virtual machine manager 120 may reduce the size of the blocks assigned to various virtual machines during the next dispatch cycle to allow virtual machine manager 120 greater access to core 104.

DVFS reordering module 126 may be configured to reorder blocks assigned to virtual machines 105 such that virtual machines 105 with the same quantized DVFS states may be grouped together within modified dispatch cycle 130. Modified dispatch cycle 130 may require execution of virtual machines with substantially the same DVFS value before execution of virtual machines with a different DVFS value. Access to core 104 may be passed to virtual machine manager 120 between execution of each virtual machine 105. For example, with reference to FIG. 2, before the reordering in dispatch cycle 124, virtual machines 105 may be grouped in the following order (proceeding clockwise from block 202): VM 106, VM 107, VM 108, VM 109, VM 110 and VM 111.

After the reordering, in modified dispatch cycle 130, virtual machines 105 may be ordered such that virtual machines 105 having substantially the same quantized DVFS states may be grouped together and executed prior to virtual machines with different DVFS states. For example, VM 106, VM 109, and VM 110, may each have substantially the same quantized DVFS state "DVFSa." Therefore, DVFS reordering module 126 may group together VM 106, VM 109 and VM 110 in blocks 203, 207 and 211 with virtual machine manager 120 in between. Similarly, VM 107 and VM 111 may each have substantially the same quantized DVFS state "DVFSb." Therefore, DVFS reordering module 126 may group together VM 107 and VM 111 in blocks 215 and 219 with virtual machine manager 120 in between. Modified dispatch cycle 130 may then be used to allow access to core 104. In generating modified dispatch cycle 130, virtual machine manager 120 may further be configured to modify its own DVFS state to match the state of a next consecutive virtual machine in modified dispatch cycle 130.

In an example, in block 201 of modified dispatch cycle 130, virtual machine manager 120 may determine that the quantized DVFS state of next consecutive virtual machine 106 in block 203 is "DVFSa." In generating modified dispatch cycle 130, virtual machine manager 120 may change the quantized DVFS state of virtual machine manager 120 during block 201 to match that of the next consecutive virtual machine 106. In the instant example, virtual machine manager 120 may change its quantized DVFS state from "DVFSc" to "DVFSa," to match the quantized DVFS state of next consecutive virtual machine, VM 106. Similarly, in block 213, virtual machine manager 120 may change its quantized DVFS state from "DVFSa" to "DVFSb." After changing DVFS states in blocks 201 and 213, virtual machine manager 120 may adjust a size of blocks in modified dispatch cycle 130. By changing the DVFS state of virtual machine manager 120, core 104 may switch from virtual machine manager 120 (in block 201) to VM 106 (in block 203) to VMM 120 (in block 205) to VM 109 (in block 207) to VMM 120 (in block 209) to VM 110 (in block 211) to VMM 120 (in block 213) without experiencing a DVFS switch.

During operation of modified dispatch cycle 130, virtual machine manager 120 may generate a new modified dispatch cycle if the DVFS values have changed. In an example, proceeding from block 203 to block 205, VM 106's entitlement period to core 104 may elapse. VM 106 may exit to virtual machine manager 120 at block 205. Virtual machine manager 120 may be passed access to core 104. Virtual machine manager 120 may determine if the DVFS state of next consecutive virtual machine VM 109 has changed. Virtual machine manager 120 may determine the quantized DVFS state of next consecutive virtual machine 109 such as by analyzing a virtual machine control buffer. The virtual machine control buffer may be, for example, a register or other memory configured to store information relating to a virtual machine including one or more virtual machine DVFS states. The virtual machine control buffer may be associated with a particular core 104.

If virtual machine manager 120 determines that the DVFS state of VM 109 changed, DVFS quantization module 122 may re-quantize DVFS values of virtual machines 105 into a limited number of DVFS states. Blocks in modified dispatch cycle 130 may then be re-adjusted and re-ordered to provide virtual machine manager 120 sufficient core time.

During execution of modified dispatch cycle 130, a particular virtual machine 105 may enter a wait state. A wait state may be, for example, a state in which virtual machine 105 remains idle until an input is received. When a virtual machine 105 enters a wait state, virtual machine manager 120 may be configured to cause an exit from waiting virtual machine 105 to virtual machine manager 120. Virtual machine manager 120 may pass access to core 104 to the next consecutive virtual machine 105 of modified dispatch cycle 130. Waiting virtual machine 105 may receive a processing credit corresponding to the remaining time allotted for the waiting virtual machine in modified dispatch cycle 130. Prior to the completion of modified dispatch cycle 130, virtual machine manager 120 may pass access to core 104 back to waiting virtual machine 105 for an amount of time corresponding to the processing credit.

Among other possible benefits, a system in accordance with the disclosure may reduce the number of DVFS switches in a virtualized environment. As DVFS switching takes time, reducing the number of DVFS switches may increase processing speed by reducing lag. Quantizing DVFS values of different virtual machines may produce a greater probability that some virtual machines will have the same DVFS values as one another. Virtual machines with matching DVFS values may be grouped together within a dispatch cycle such that these virtual machines may be executed consecutively. Such a grouping may eliminate the need to switch DVFS states between execution of the virtual machines. Reducing the number of DVFS switches may also reduce power consumption of a computing system.

Figure 3:
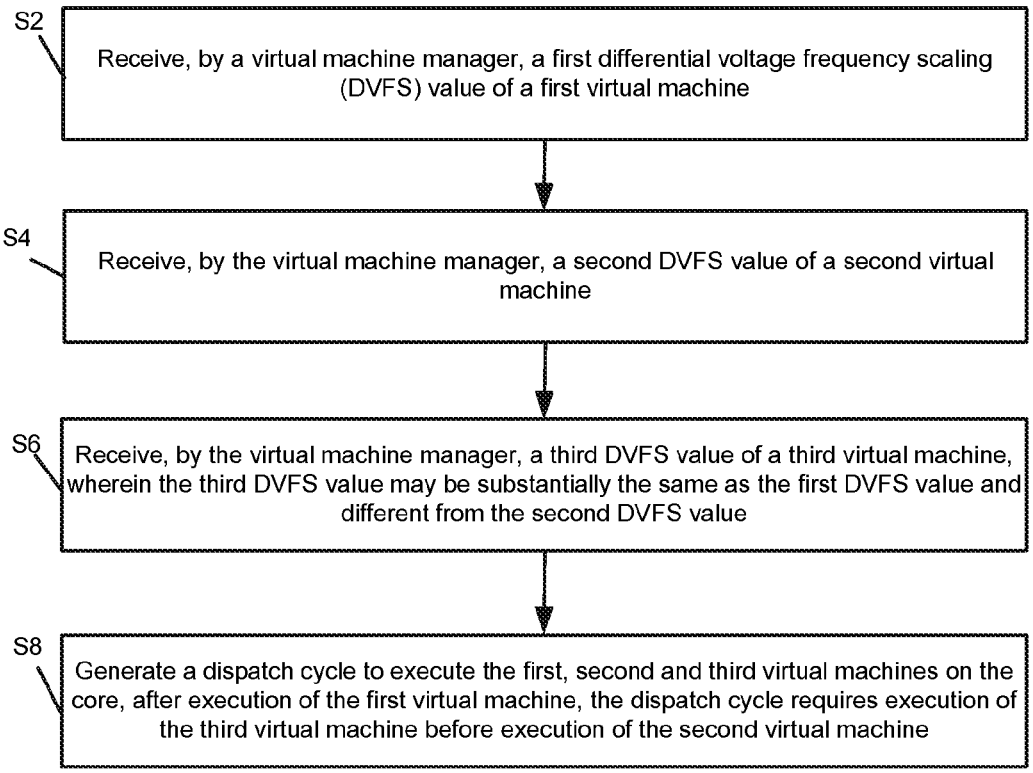
FIG. 3 depicts a flow diagram for example processes for implementing DVFS switch reduction.

FIG. 3 depicts a flow diagram for example processes for implementing DVFS switch reduction, arranged in accordance with at least some embodiments described herein. In some examples, the process in FIG. 3 could be implemented using processor 100 discussed above and could be used to schedule access to a core. An example process may include one or more operations, actions, or functions as illustrated by one or more of blocks S2, S4, S6 and/or S8. Although illustrated as discrete blocks, various blocks may be divided into additional blocks, combined into fewer blocks, or eliminated, depending on the desired implementation.

Processing may begin at block S2, "Receive a first differential voltage frequency scaling (DVFS) value of a first virtual machine." At block S2, a first DVFS value of a first virtual machine may be received, by a virtual machine manager. In an example, the first DVFS value may be quantized into a finite set of discrete DVFS states.

Processing may continue from block S2 to block S4, "Receive, by the virtual machine manager, a second DVFS value of a second virtual machine." At block S4, a second DVFS value of a second virtual machine may be received.

Processing may continue from block S4 to block S6, "Receive, by the virtual machine manager, a third DVFS value of a third virtual machine, the third DVFS value may be substantially the same as the first DVFS value and different from the second DVFS value." At block S6, a third DVFS value of a third virtual machine may be received. The third DVFS value may be substantially the same as the first DVFS value and different from the second DVFS value.

Processing may continue from block S6 to block S8, "Generate a dispatch cycle to execute the first, second and third virtual machines on the core, after execution of the first virtual machine, the dispatch cycle requires execution of the third virtual machine before execution of the second virtual machine." At block S8, a dispatch cycle may be generated. The dispatch cycle may execute the first, second and third virtual machines on the core. After execution of the first virtual machine, the dispatch cycle may require execution of the third virtual machine before execution of the second virtual machine.

In an example, the first, second and third DVFS values may be quantized into a finite set of discrete DVFS states prior to generation of the dispatch cycle. In another example, generating the dispatch cycle may include adjustment of sizes of blocks of core time for each of the first, second and third virtual machines based on at least one of respective processing needs and/or service level guarantees for the first, second and third virtual machines. In another example, the dispatch cycle may be modified to generate a modified dispatch cycle. The modified dispatch cycle may cause the core to execute a virtual machine manager at the first DVFS value.

In a further example, generating the modified dispatch cycle may include adjustment of sizes of blocks of core time for each of the first, second and third virtual machines based on at least one of respective processing needs and/or service level guarantees for the first, second and third virtual machines. In another example, generating the modified dispatch cycle may further comprise adjustment of a size of blocks of core time for the virtual machine manager. In another example, a determination may be made that at least one of the first, second or third DVFS values has changed to a new DVFS value. A new dispatch cycle may be generated based on the new DVFS value.

FIG. 4 illustrates an example computer program product 400 that can be utilized to implement DVFS switch reduction, arranged in accordance with at least some embodiments described herein. Program product 400 may include a signal bearing medium 402. Signal bearing medium 402 may include one or more instructions 404 that, when executed by, for example, a processor 100, may provide the functionality described above with respect to FIGS. 1-3. Thus, for example, referring to the system of FIG. 1, processor core 104 may undertake one or more of the blocks shown in FIG. 4 in response to instructions 404 conveyed to the processor 100 by medium 402.

In some implementations, signal bearing medium 402 may encompass a computer-readable medium 406, such as, but not limited to, a hard disk drive, a Compact Disc (CD), a Digital Video Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, program product 400 may be conveyed to one or more modules of the processor 100 by an RF signal bearing medium 402, where the signal bearing medium 402 is conveyed by a wireless communications medium 410 (e.g., a wireless communications medium conforming with the IEEE 802.11 standard).

Figure 5:
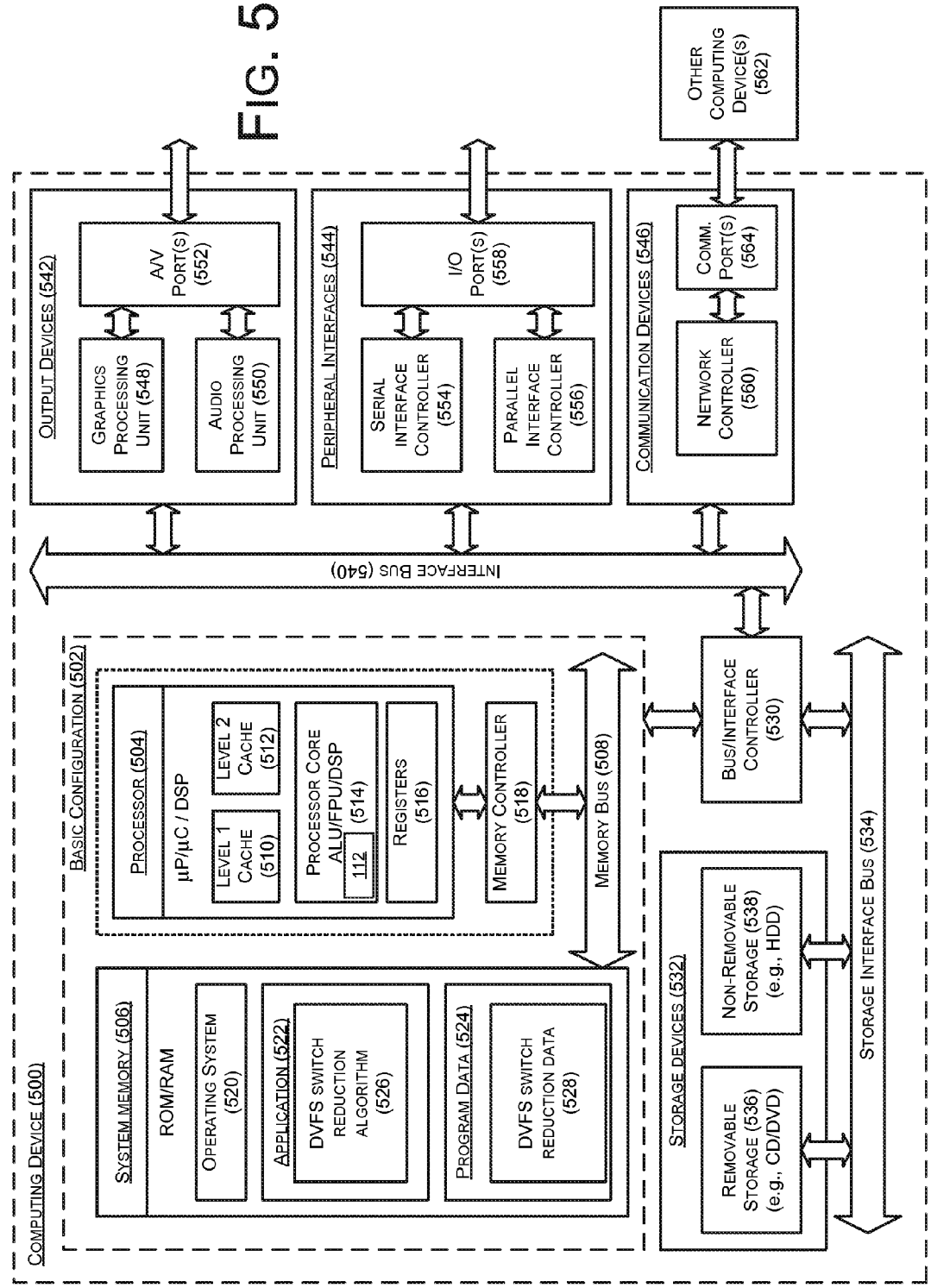
FIG. 5 is a block diagram illustrating an example computing device that is arranged to implement DVFS switch reduction, all arranged according to at least some embodiments described herein.

FIG. 5 is a block diagram illustrating an example computing device 500 that is arranged to implement DVFS switch reduction, arranged in accordance with at least some embodiments described herein. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one more levels of caching, such as a level one cache 510 and a level two cache 512, a processor core 514, and registers 516. An example processor core 514 may include virtualization handler 112, an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522 and program data 524. Application 522 may include a DVFS switch reduction algorithm 526 that is arranged to perform the functions as described herein including those described with respect to system 100 of FIGS. 1-4. Program data 524 may include DVFS switch reduction data 528 that may be useful to implement DVFS switch reduction as is described herein. In some embodiments, application 522 may be arranged to operate with program data 524 on operating system 520 such that DVFS switch reduction may be provided. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to schedule access to a core, the method comprising:
receiving, by a virtual machine manager, a first differential voltage frequency scaling (DVFS) value of a first virtual machine;
receiving, by the virtual machine manager, a second DVFS value of a second virtual machine;
receiving, by the virtual machine manager, a third DVFS value of a third virtual machine, wherein the third DVFS value is substantially the same as the first DVFS value and different from the second DVFS value, and wherein the first, second, and third virtual machines are different virtual machines; and
generating a dispatch cycle to execute the first, second, and third virtual machines on the core, wherein after execution of the first virtual machine, the dispatch cycle requires execution of the third virtual machine before execution of the second virtual machine.

2. The method of claim 1, further comprising, prior to generation of the dispatch cycle:
quantizing the first, second, and third DVFS values into a finite set of discrete DVFS states.

3. The method of claim 1, wherein generating the dispatch cycle comprises adjustment of sizes of blocks of core time for each of the first, second, and third virtual machines based on at least one of respective processing needs and/or service level guarantees for the first, second, and third virtual machines.

4. The method of claim 1, further comprising:
modifying the dispatch cycle to generate a modified dispatch cycle, wherein the modified dispatch cycle causes the core to:
execute the virtual machine manager at the first DVFS value;
execute the third virtual machine;
execute the virtual machine manager at the third DVFS value;
execute the virtual machine manager at the second DVFS value; and
execute the second virtual machine.

5. The method of claim 4, wherein generating the modified dispatch cycle comprises adjustment of sizes of blocks of core time for each of the first, second, and third virtual machines based on at least one of respective processing needs and/or service level guarantees for the first, second, and third virtual machines.

6. The method of claim 5, wherein generating the modified dispatch cycle further comprises adjustment of sizes of blocks of core time for the virtual machine manager.

7. The method of claim 1, further comprising:
determining that at least one of the first, second, or third DVFS values has changed to a new DVFS value; and
generating a new dispatch cycle based on the new DVFS value.

8. A method to schedule access to a core, the method comprising:
receiving, by a virtual machine manager, a first differential voltage frequency scaling (DVFS) value of a first virtual machine;
receiving, by the virtual machine manager, a second DVFS value of a second virtual machine, wherein the first and second virtual machines are different virtual machines, and wherein the first DVFS value is different from the second DVFS value;
generating a first dispatch cycle to execute the first and second virtual machines on the core; and
modifying the first dispatch cycle to produce a second dispatch cycle, wherein the second dispatch cycle causes the core to:
execute the virtual machine manager at the first DVFS value prior to execution of the first virtual machine;
execute the first virtual machine;
execute the virtual machine manager at the first DVFS value;

execute the virtual machine manager at the second DVFS value; and execute the second virtual machine.

9. The method of claim 8, further comprising, prior to generation of the first dispatch cycle:

quantizing the first and second DVFS values into a finite set of discrete DVFS states.

10. The method of claim 8, further comprising:

determining that at least one of the first or second DVFS values has changed to a new DVFS value; and generating a third dispatch cycle based on the new DVFS value.

11. The method of claim 8, wherein generating the first dispatch cycle comprises adjustment of sizes of blocks of core time for each of the first and second virtual machines based on at least one of respective processing needs and/or service level guarantees for the first and second virtual machines.

12. The method of claim 11, wherein generating the second dispatch cycle comprises adjustment of sizes of blocks of core time for each of the first and second virtual machines based on at least one of respective processing needs and/or service level guarantees for the first and second virtual machines.

13. The method of claim 12, wherein generating the second dispatch cycle further comprises adjustments of sizes of blocks of core time for the virtual machine manager.

14. A system effective to schedule access to a core, the system comprising:

a memory that stores instructions; and a processor configured to be in communication with the memory, the processor effective to, in accordance with the instructions:

receive, by a virtual machine manager, a first differential voltage frequency scaling (DVFS) value of a first virtual machine;

receive, by the virtual machine manager, a second DVFS value of a second virtual machine;

receive, by the virtual machine manager, a third DVFS value of a third virtual machine, wherein the third DVFS value is substantially the same as the first DVFS value and different from the second DVFS value, and wherein the first, second, and third virtual machines are different virtual machines; and generate a dispatch cycle to execute the first, second, and third virtual machines on the core, wherein after execution of the first virtual machine, the dispatch cycle requires execution of the third virtual machine before execution of the second virtual machine, and wherein the dispatch cycle causes the core to:

execute the virtual machine manager at the first DVFS value;

execute the third virtual machine;

execute the virtual machine manager at the third DVFS value;

execute the virtual machine manager at the second DVFS value; and execute the second virtual machine.

15. The system of claim 14, wherein the processor is further effective to, prior to generation of the dispatch cycle:

quantize the first, second, and third DVFS values into a finite set of discrete DVFS states.

16. The system of claim 14, wherein the processor is further effective to:

determine that at least one of the first, second, or third DVFS values has changed to a new DVFS value; and generate a new dispatch cycle based on the new DVFS value.

17. The system of claim 14, wherein generating the dispatch cycle comprises adjustment of sizes of blocks of core time for each of the first, second, and third virtual machines based on at least one of respective processing needs and/or service level guarantees of the first, second, and third virtual machines.

18. The system of claim 17, wherein generating the dispatch cycle further comprises adjustment of sizes of blocks of core time for the virtual machine manager.

* * * * *